Sept. 21, 1926.

A. GENTILONI

EMERGENCY AUTOMOBILE BRAKE

Filed Feb. 25, 1925

1,600,465

INVENTOR.
Antonio Gentiloni
BY
ATTORNEYS.

Patented Sept. 21, 1926.

1,600,465

UNITED STATES PATENT OFFICE.

ANTONIO GENTILONI, OF TRENTON, NEW JERSEY.

EMERGENCY AUTOMOBILE BRAKE.

Application filed February 25, 1925. Serial No. 11,417.

This invention relates to an emergency braking means for automobiles, the invention having for an object to provide a novel tire gripping device that acts to lock the wheels against rotation when the bumper is struck by some object.

For further comprehension of the invention, and of the objects and advantages thereof, reference will be had to the following description and accompanying drawing, and to the appended claims in which the various novel features of the invention are more particularly set forth.

Fig. 1 of the drawing is a plan view, showing my improved braking device applied to an automobile chassis.

Figure 1:
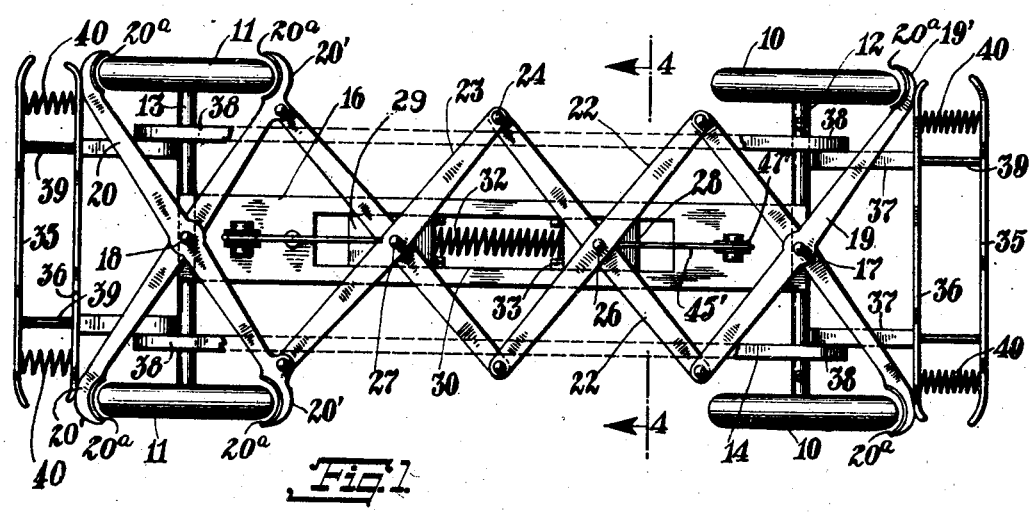
Figure 2:
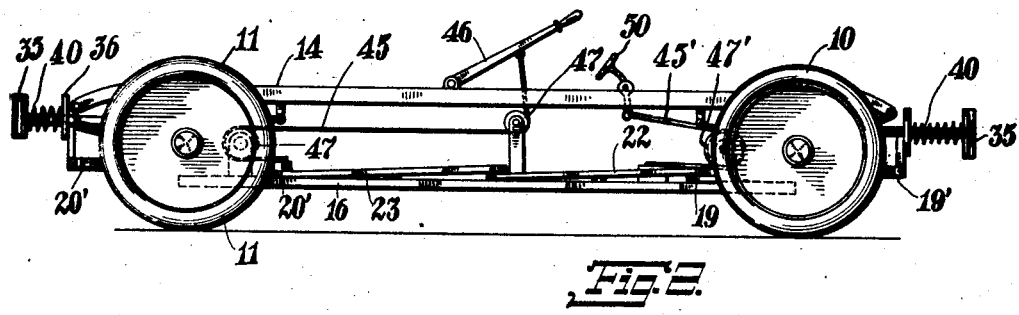
Fig. 2 is a side view thereof.
Figures 3, 4:
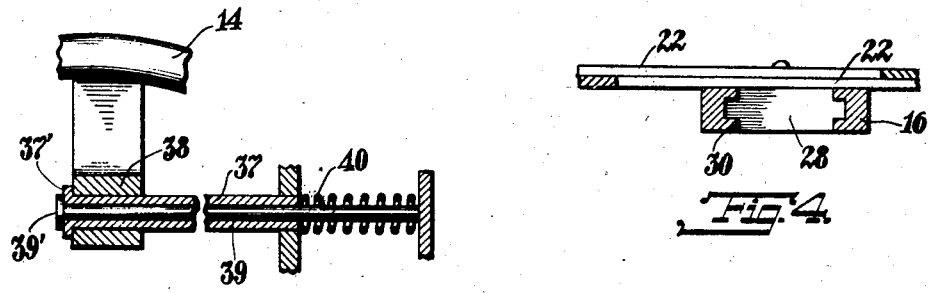
Fig. 3 is a fragmentary longitudinal sectional view showing the mounting of the bumper.
Fig. 4 is a detail transverse sectional view taken on the line 4—4 of Fig. 1.

Referring now to the drawing the reference numerals 10 and 11 indicate the front and rear wheels respectively of an automobile, the front and rear axles being indicated at 12 and 13 respectively, while the usual side frame members of the chassis are indicated at 14. According to my invention I provide a longitudinally extending frame bar 16 that may be supported by the front and rear axles at its opposite ends, or may be suspended from the side frame members by suitable cross pieces. Upon this frame bar 16 are pivoted, between their ends as at 17 and 18, a front pair of toggle links or bars 19 and a rear pair 20, these toggle bars having curved outer ends 19' and 20' that project across the edges of the front and rear wheels respectively, and which are padded as at 20ª to form brake shoes that are adapted to be pressed against the said wheels to lock the same against rotation when the bumper bar is struck.

These toggle bars or links are connected at their adjacent ends by a toggle link structure whereby movement is communicated from the front pair to the rear pair. This toggle link structure comprises the front pair of links 22 that connects to the front bars 19 and the rear pair 23 that connects to the rear bars, these pairs of intermediate or connecting links being connected together at their adjacent ends as at 24. These pairs of links 22 and 23 are supported by the frame element 16 to have bodily sliding movement thereon, as well as swinging movement, and to this end they are pivoted as at 26 and 27 upon the blocks 28 and 29 respectively, which latter are slidable in a guide groove 30 in the frame member 16. These blocks have connected to their adjacent ends the tension spring 32 that urges them toward one another, movement of the blocks under the influence of the said springs being limited by the lugs 33 on the frame bar 16.

The bumper bar comprises a pair of bars 35 and 36 that extend transversely in front and rear of the automobile and are located one in front of the other. The rear bar 36 is fixed on the front ends of sleeves 37 that are slidable in bearing elements 38 fixed to the side frame members 14, while the front bar 35 is fixed on rods 39 that are slidable in the said sleeves. The rear bar is engaged on its rear side by the curved brake shoe elements 19', while a series of coiled cushion springs 40 are positioned between the two bars 35 and 36. The sleeves 37 and the rods 39 are held against forward displacement by means of the flange elements 37' and 39' respectively on their rear ends, the former of which bears on the bearing elements 38 and the latter on the rear end of the sleeve.

In the operation of my improved emergency braking device, when the bumper is struck a heavy blow, the rear member 36 thereof moves the brake elements 19' against the front wheel, while the toggle link connections between the said bars or links on which the said brake elements 19' are mounted and the rear toggle links or bars 20 causes the brake elements 20' on the latter to also grip the rear wheel. These rear bars may have the brake shoe elements 20' formed on both ends thereof as shown to cause the same to grip both sides of the rear wheels.

To permit of operation of the device by hand when desired the rear block 29 may have attached thereto one end of a flexible wire or rope 45 that extends rearwardly, and then forwardly and upwardly, to connect at its other end to a lever 46 mounted on the chassis of the automobile, suitable guide pulleys 47 being provided on the frame bar 16 for the said wire 45. By pulling on the lever 46 the block 29 is moved in a rearward direction, which causes the rear braking members to be operated.

To disconnect the clutch of the engine block 28 may have attached thereto one end of another flexible wire or rope 45' that extends forwardly, and then rearwardly and upward, to connect at its other end to the usual clutch operating foot pedal 50, suitable guide pulleys 47' being provided on the frame bar 16 for the said wires 45'.

Having thus described my invention, what I claim as new and desire to protect by Letters Patent of the United States is as follows:—

1. In an automobile, a bumper bar, toggle link members, brake shoe elements on said toggle link members adapted to grip the wheels of the automobile, said bumper bar being mounted for sliding movement and being adapted to engage and operate said toggle link members.

2. In an automobile, a bumper bar, front and rear pairs of toggle link bars having extended ends projecting across the wheels of the automobile to grip the latter, toggle link connections between the said front and rear toggle link bars whereby the said front bars impart movement to the rear bars, said bumper bar being mounted for rearward sliding movement and extending across the extended ends of the front bars to engage and move the said bars to operative position when the bumper bar slides backward.

3. In an automobile, a bumper bar, front and rear pairs of toggle link bars having extended ends projecting across the wheels of the automobile to grip the latter, toggle link connections between the said front and rear toggle link bars whereby the said front bars impart movement to the rear bars, said bumper bar being mounted for rearward sliding movement and extending across the extended ends of the front bars to engage and move the said bars to operative position when the bumper bar slides backward, said toggle link connections comprising two pairs of toggle link bars, and a frame element on which said bars are mounted for swinging and sliding movement.

4. In an automobile, a bumper bar, front and rear pairs of toggle link bars having extended ends projecting across the wheels of the automobile to grip the latter, toggle link connections between the said front and rear toggle link bars whereby the said front bars impart movement to the rear bars, said bumper bar being mounted for rearward sliding movement and extending across the extended ends of the front bars to engage and move the said bars to operative position when the bumper bar slides backward, said toggle link connections comprising two pairs of toggle link bars, a pair of blocks on which said pairs of bars are pivoted, and a frame element in which said blocks are slidably mounted.

5. In an automobile, a bumper bar, front and rear pairs of toggle link bars having extended ends projecting across the wheels of the automobile to grip the latter, toggle link connections between the said front and rear toggle link bars whereby the said front bars impart movement to the rear bars, said bumper bar being mounted for rearward sliding movement and extending across the extended ends of the front bars to engage and move the said bars to operative position when the bumper bar slides backward, said toggle link connections comprising two pairs of toggle links bars, a pair of blocks on which said pairs of bars are pivoted, and a frame element in which said blocks are slidably mounted, and a tension spring connected at opposite ends to said blocks.

6. In an automobile, a bumper bar, front and rear pairs of toggle link bars having extended ends projecting across the wheels of the automobile to grip the latter, toggle link connections between the said front and rear toggle link bars whereby the said front bars impart movement to the rear bars, said bumper bar being mounted for rearward sliding movement and extending across the extended ends of the front bars to engage and move the said bars to operative position when the bumper bar slides backward, said toggle link connections comprising two pairs of toggle link bars, a pair of blocks on which said pairs of bars are pivoted, and a frame element in which said blocks are slidably mounted, and a tension spring connected at opposite ends to said blocks, and a manually operable device connected to one of said blocks to move the same and operate the rear toggle link bars and cause their extended ends to grip the rear wheel.

In testimony whereof I have affixed my signature.

ANTONIO GENTILONI.